(12) United States Patent
Lin et al.

(10) Patent No.: US 9,324,165 B2
(45) Date of Patent: Apr. 26, 2016

(54) METHOD AND DEVICE FOR GENERATING A PREDICTED VALUE OF AN IMAGE USING INTERPOLATION AND MOTION VECTORS

(71) Applicant: Huawei Technologies Co., Ltd., Shenzhen, Guangdong (CN)

(72) Inventors: Sixin Lin, Shenzhen (CN); Mingyuan Yang, Shenzhen (CN); Haoping Yu, Shenzhen (CN); Jiantong Zhou, Shenzhen (CN); Cunbin Pan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 553 days.

(21) Appl. No.: 13/738,773

(22) Filed: Jan. 10, 2013

(65) Prior Publication Data
US 2013/0129242 A1    May 23, 2013

Related U.S. Application Data

(63) Continuation of application No. PCT/CN2011/075034, filed on May 31, 2011.

(30) Foreign Application Priority Data

Jul. 10, 2010    (CN) .......................... 2010 1 0227642

(51) Int. Cl.
*H04N 7/12* (2006.01)
*G06T 9/00* (2006.01)
(Continued)

(52) U.S. Cl.
CPC .............. *G06T 9/004* (2013.01); *H04N 19/109* (2014.11); *H04N 19/117* (2014.11);
(Continued)

(58) Field of Classification Search
CPC ............................. H04N 19/56; H04N 19/117
USPC ....................................................... 375/240.16
See application file for complete search history.

(56) References Cited

U.S. PATENT DOCUMENTS

2003/0152146 A1    8/2003    Lin et al.
2004/0057519 A1    3/2004    Yamamoto et al.
(Continued)

FOREIGN PATENT DOCUMENTS

CN    1492690 A    4/2004
CN    1993994 A    7/2007
(Continued)

OTHER PUBLICATIONS

Foreign Communication From A Counterpart Application, European Application No. 11789219.0, Extended European Search Report dated Aug. 2, 2013, 10 pages.
(Continued)

*Primary Examiner* — Richard Torrente
(74) *Attorney, Agent, or Firm* — Huawei Technologies Co., Ltd.

(57) ABSTRACT

A method and device for generating a predicted value of image that are mostly used to generate a predicted value of a current block during image encoding or decoding. The method includes: determining a searching scope, wherein multiple motion vectors are included in the searching scope; performing up-sampling interpolations on first reference blocks, corresponding to the motion vector in the searching scope, in a reference image of the current block by using a first filter to obtain up-sampled first reference blocks; by using the up-sampled first reference blocks, obtaining at least one candidate motion vector corresponding to the current block; performing up-sampling interpolations on second reference blocks, corresponding to the at least one candidate motion vector, in the reference image of the current block by using a second filter to obtain up-sampled second reference blocks; combining the up-sampled second reference blocks to obtain a predicted value of the current block.

19 Claims, 11 Drawing Sheets

(51) Int. Cl.

| | | |
|---|---|---|
| *H04N 19/56* | (2014.01) | |
| *H04N 19/149* | (2014.01) | |
| *H04N 19/109* | (2014.01) | |
| *H04N 19/117* | (2014.01) | |
| *H04N 19/53* | (2014.01) | |
| *H04N 19/523* | (2014.01) | |
| *H04N 19/577* | (2014.01) | |

(52) U.S. Cl.
CPC .......... *H04N 19/149* (2014.11); *H04N 19/523* (2014.11); *H04N 19/53* (2014.11); *H04N 19/56* (2014.11); *H04N 19/577* (2014.11)

(56) References Cited

U.S. PATENT DOCUMENTS

| | | |
|---|---|---|
| 2005/0013369 A1 | 1/2005 | Lee |
| 2005/0207496 A1* | 9/2005 | Komiya et al. .......... 375/240.16 |
| 2008/0089597 A1 | 4/2008 | Guo et al. |
| 2008/0212675 A1 | 9/2008 | Ohgose et al. |
| 2010/0079667 A1 | 4/2010 | Tueretken et al. |

FOREIGN PATENT DOCUMENTS

| | | | |
|---|---|---|---|
| CN | 101558651 | A | 10/2009 |
| CN | 101605256 | A | 12/2009 |
| WO | 2009045021 | A2 | 4/2009 |

OTHER PUBLICATIONS

Kamp, S., et al., "Multihypothesis Prediction Using Decoder Side Motion Vector Derivation in Inter Frame Video Coding," SPIE, Visual Communications and Image Processing 2009, XP030081712, vol. 7257, Jan. 19, 2009, 8 pages.

Kamp, S., et al., "Fast Decoder Side Motion Vector Derivation for Inter Frame Video Coding," Aachen, Germany, In Proceeding of: Picture Coding Symposium, XP030081800, Jun. 2009, 4 pages.

Haitao, Y., et al., "Description of Video Coding Technology Proposal by Huawei Technologies & Hisilicon Technologies," Joint Collaborataive Team on Video Coding (JCT-VC) of ITU-T SG16 WP3 and ISO/IEC JTC1/SC29/WG11, 1st Meeting: Dresden, DE, JCTVC-A111, Apr. 15-23, 2010, 26 pages.

Mukherjee, et al., "A Simple Reversed-Complexity Wyner-Ziv Video Coding Mode Based on a Spatial Reduction Framework," HPL-2006-175, Visual Communications and Image Processing, Jan. 28-Feb. 1, 2007, 13 pages.

Foreign Communication From a Related Counterpart Application—English Translation International Search Report, PCT/CN2011/075034, Sep. 15, 2011, 3 pages.

Foreign Communication From a Related Counterpart Application—English Translation Written Opinion, PCT/CN2011/075034, Sep. 15, 2011, 3 pages.

* cited by examiner

METHOD AND DEVICE FOR GENERATING A PREDICTED VALUE OF AN IMAGE USING INTERPOLATION AND MOTION VECTORS

CROSS-REFERENCE TO RELATED APPLICATIONS

This application is a continuation of International Application No. PCT/CN2011/075034, filed on May 31, 2011, which claims priority to Chinese Patent Application No. 201010227642.7, filed on Jul. 10, 2010, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to image encoding/decoding techniques in the field of signal processing. More particularly, the present invention relates to a method and device for generating a predicted value of an image.

BACKGROUND

As the continuous development of video encoding techniques, intra-frame motion searching and compensating techniques are capable of effectively removing time redundancy of video contents, greatly improving the efficiency of encoding; motion information is obtained through motion estimation and is then transmitted to a decoder where a video image is predicted and reconstructed by means of a method of motion compensation. Intra-frame motion compensation prediction technique means performing motion compensation by using motion vectors obtained through search in a process of encoding and decoding, so as to realize corresponding encoding and decoding operations.

As an encoding and decoding method, a technique for derivable motion vectors on decoder becomes more and more familiar to people for its great contributions to the encoding efficiency, and its great values are recognized by people, while being accepted as an important candidate tool for future video encoding standard.

A method from among the conventional techniques for derivable motion vectors for acquiring motion information comprises: obtaining a motion vector through template matching. Specifically, assuming that the current block is a macro block in frame B, as shown in FIG. 1. First, a template TM is constructed around the current block by using reconstruction values, and then motion vectors MV0 and MV1 are obtained as the motion vectors of the current block by performing search matching using a template of the same shape as the template TM in a forward reference image (Ref List0) and a backward reference image (Ref List1) of the block, a predicted value of the current block is obtained at the same time, and a predicted residual decoding is performed on the predicted value.

In the implementation of the present invention, the inventor found that at least the following defects exist in the prior art: the encoder does not transmit the motion vector of a predicted value to the decoder, and the decoder needs to obtain, before restoring a current block, the motion vector of the current block by means of a motion search process which increases the complexity of the decoder.

SUMMARY

An object of the embodiments of the present invention is to provide a method and device for generating a predicted value of an image, so as to lower the complexity of a decoder.

According to an embodiment of the present invention, there is provided a method for generating a predicted value of an image, which is used to generate a predicted value of a current block during image encoding, the method comprising the steps of: determining a searching scope, wherein multiple motion vectors are included in the searching scope; performing up-sampling interpolations on first reference blocks by using a first filter to obtain up-sampled first reference blocks, wherein the first reference blocks are the reference blocks in a reference image of the current block corresponding to the motion vectors in the searching scope; obtaining at least one candidate motion vector corresponding to the current block by using the up-sampled first reference blocks; performing up-sampling interpolations on second reference blocks by using a second filter to obtain up-sampled second reference blocks, wherein the second reference blocks are the reference blocks in the reference image of the current block corresponding to the at least one candidate motion vector; and combining the up-sampled second reference blocks to generate a predicted value of the current block.

According to another embodiment of the present invention, there is provided a device for generating a predicted value of an image, which is used to generate a predicted value of a current block during image encoding, the device comprising: a determining unit configured to determine a searching scope, wherein multiple motion vectors are included in the searching scope; a first up-sampling unit configured to perform up-sampling interpolations on first reference blocks by using a first filter to obtain up-sampled first reference blocks, wherein the first reference blocks are the reference blocks in a reference image of the current block corresponding to the motion vectors in the searching scope; a motion searching unit configured to obtain at least one candidate motion vector corresponding to the current block by using the up-sampled first reference blocks; a second up-sampling unit configured to perform up-sampling interpolations on second reference blocks by using a second filter to obtain up-sampled second reference blocks, wherein the second reference blocks are the reference blocks in the reference image of the current block; and a combining unit configured to combine the up-sampled second reference blocks to generate a predicted value of the current block.

The embodiments of the present invention lower the complexity of the encoder and decoder to a certain extent by using known information around to perform predictive search, and at the same time, reference image with subpixel precision may be obtained by using two filters to perform interpolations on a reference image, improving the performance of the decoder.

BRIEF DESCRIPTION OF THE DRAWINGS

In order to more clearly describe the technical solutions of the prior art or the embodiments of the present invention, the drawings to be used in the descriptions of the prior art or the embodiments are briefly introduced as follows. Obviously, the following drawings just illustrate some embodiments of the present invention, and a person skilled in the art can obtain other drawings from these drawings without paying a creative effort.

DETAILED DESCRIPTION

The technical solutions of the embodiments of the present invention will be clearly and completely described as follows in conjunction with the drawings. Apparently, the described embodiments are just a part of embodiments of the present invention rather than all the embodiments. Based on the embodiments of the present invention, any other embodiment obtained by a person skilled in the art without paying a creative effort will fall within the protection scope of the present invention.

Figure 1:
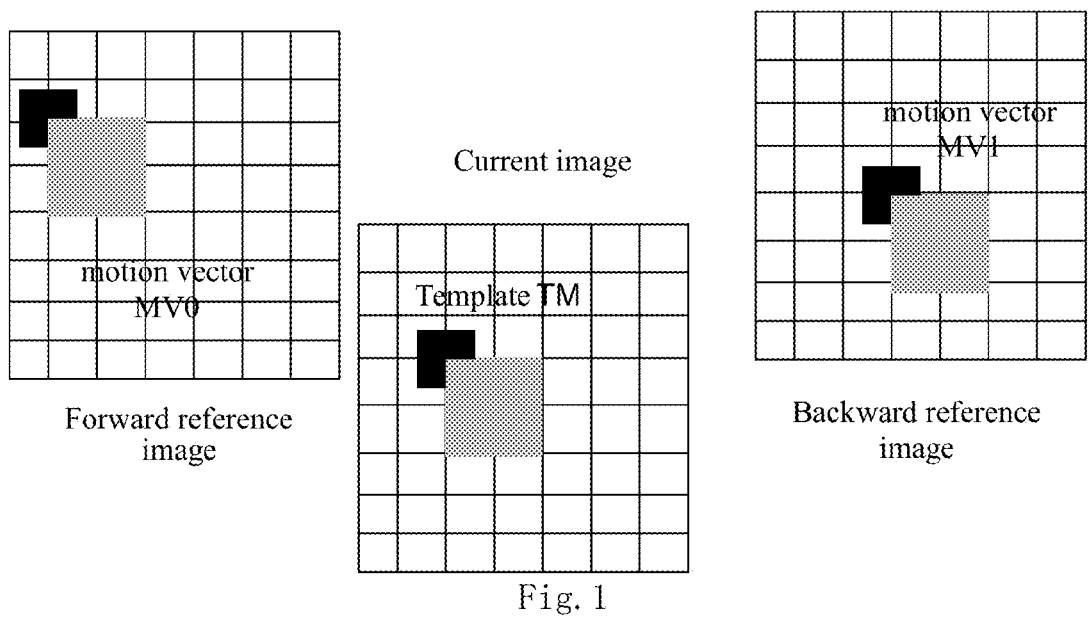
FIG. 1 is a schematic diagram of obtaining a motion vector in the prior art.
Figure 2:
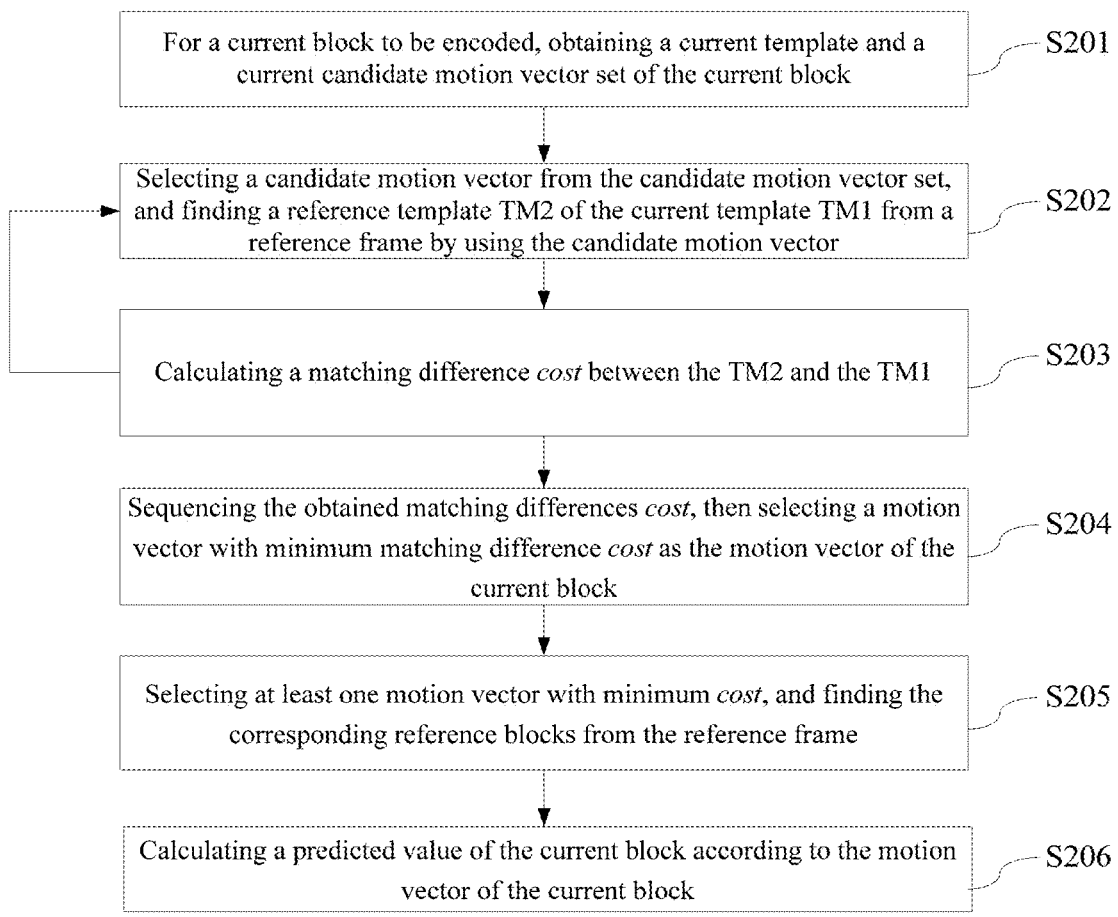
FIG. 2 is a flowchart of a method for generating a predicted value of an image according to an embodiment of the present invention.

Referring to FIG. 2, a method for generating a predicted value of an image according to an embodiment of the present invention is shown, the method comprising the steps of:

S201: for a current block Curr_Blk to be encoded, obtaining a current template and a candidate motion vector set of the current block.

Figure 3:
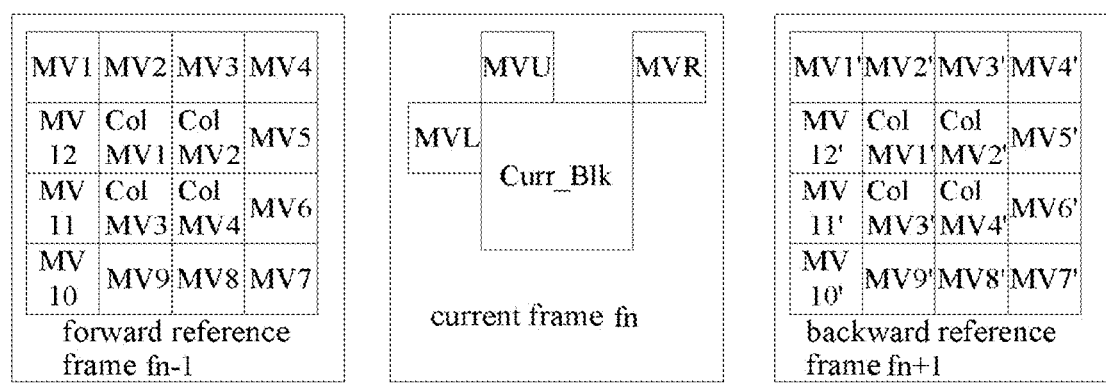
FIG. 3 is a schematic diagram of obtaining a candidate motion vector set of a current block.
Figure 4:
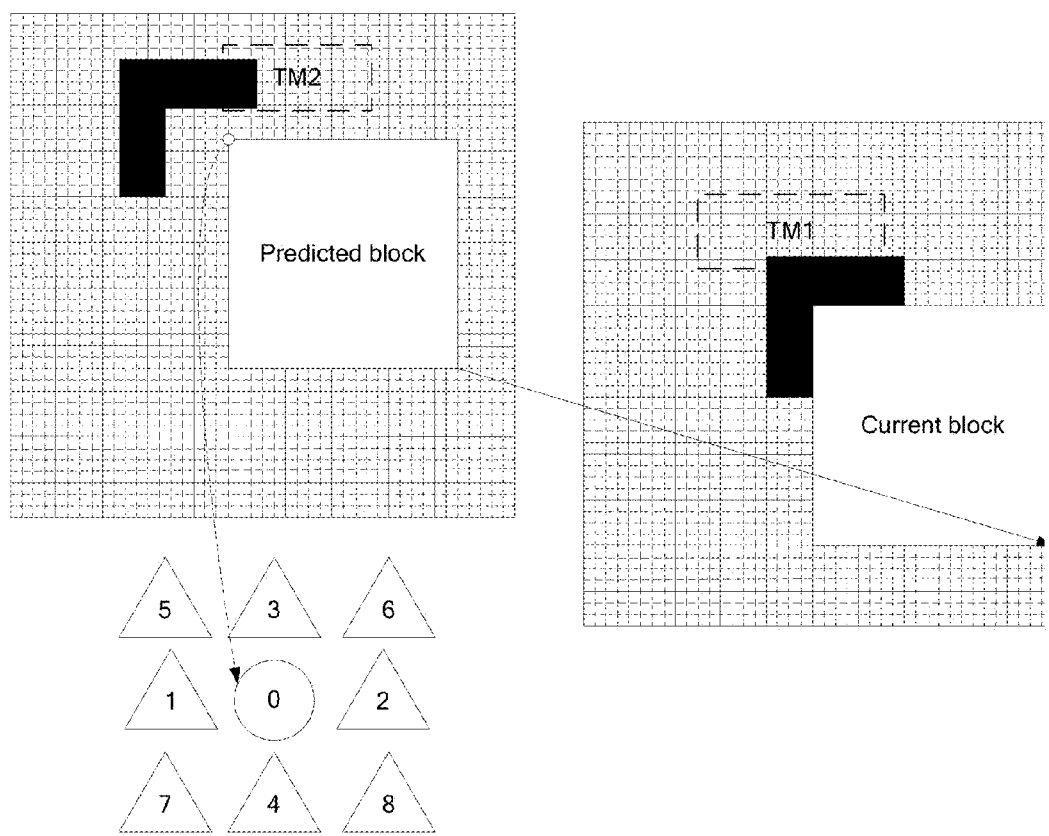
FIG. 4 is a schematic diagram of obtaining a current template and a reference template of a current block.

A template, for example, TM1 shown in FIG. 4, is constructed by using reconstructed pixels around the current block Curr_Blk. A candidate motion vector set is constructed by using known motion vectors around the current block, such as MVL, MVU and MVR shown in FIG. 3, and the motion vectors of the same positions in the previous and next frames, such as colMV1, colMV2 ... colMV4, etc.

S202: selecting a candidate motion vector from the candidate motion vector set, and finding a reference template TM2 of the current template TM1 from a reference image by using the selected candidate motion vector.

As shown in FIG. 4, it is assumed that a reference template TM2 of the current template TM1 is found in the reference image by using a candidate motion vector MVL. If MVL is an integer pixel shift vector, TM2 is directly obtained by offsetting the MVL in the reference image.

If MVL is a subpixel shift vector, up-sampling is performed on the reference image; for example, first, up-sampling on an original reference image is performed by using a 6-tap filter [1, −5, 20, 20, −5, 1] or an adaptive interpolation filter (AIF) in H.264/AVC Standard to obtain the up-sampled reference image, and then the subpixel offset MVL is moved in the sampled reference image to obtain TM2.

In order to obtain a fine motion vector, a subpixel search may be further performed within neighborhood of surrounding subpixel distance from the current candidate motion vector. For example, as shown in FIG. 4, position 0 indicates the position of the current candidate motion vector, and positions 1, 2, ..., 8 indicate neighborhood positions of subpixel distances from the position indicated by the current candidate motion vector. If it is at a subpixel position of the reference image, such as a half pixel position, up-sampling on an original reference image is first performed by using a filter (such as a 6-tap filter [1, −5, 20, 20, −5, 1] in H.264/AVC Standard) to obtain the up-sampled reference image (the reference image here may not be a whole image, but image blocks of the reference image), and then the subpixel offset MVL is moved in the sampled reference image to obtain TM2.

S203: calculating a matching difference cost between TM2 and TM1.

In particular, a sum of absolute differences (SAD), a sum of absolute transformation differences, or a sum of absolute square differences, and of course, some other parameters describing the similarity between two reference blocks, may be used.

A motion vector is selected from those unselected motion vectors in the candidate motion vector set, and steps S202 and S203 are repeatedly executed; in this manner, matching differences cost1, cost2, cost3 ... between the current template and the reference template to which each candidate motion vector corresponds are obtained.

S204: sequencing the obtained matching differences cost, then selecting a motion vector with the minimum matching difference cost as the motion vector of the current block.

S205: selecting at least one motion vector with minimum cost, then finding the corresponding reference blocks in the reference image.

S206: calculating a predicted value of the current block according to the motion vector of the current block.

First, several (for example, 4) motion vectors with the minimum matching difference are selected, and the corresponding reference blocks are found in the reference image; if the motion vectors are subpixel motion vectors, up-sampling is then performed on the reference blocks by using a filter motion vector same as that used in the motion search (such as a 6-tap filter [1, −5, 20, 20, −5, 1] or an adaptive interpolation filter in H.264/AVC Standard), to thereby obtain the up-sampled blocks as predicted values of the current block; these four predicted values with minimum matching difference are combined to generate the predicted value of the current block; for example, the four predicted values with minimum matching difference are averaged as the predicted value of the current block, to thereby predict the current block.

At the encoder, a residual value is obtained by subtracting the predicted value from the current original block, the residual value is transformed and quantized and is encoded into a code stream. At the decoder, the residual value is decoded and a restored value of the current block is obtained by adding the predicted value to the residual value.

In this embodiment, it is possible to lower the complexity of a decoder to a certain extent by using the known motion vectors around as the candidate motion vectors to perform predictive search; however, the complexity of encoder and decoder is relatively high as compared with a conventional method in which motion information is transmitted in code streams. After conducting an analysis, the inventor found that the up-sampling process in the motion search is one of the steps of the method consuming the calculation resources most.

Figure 5:
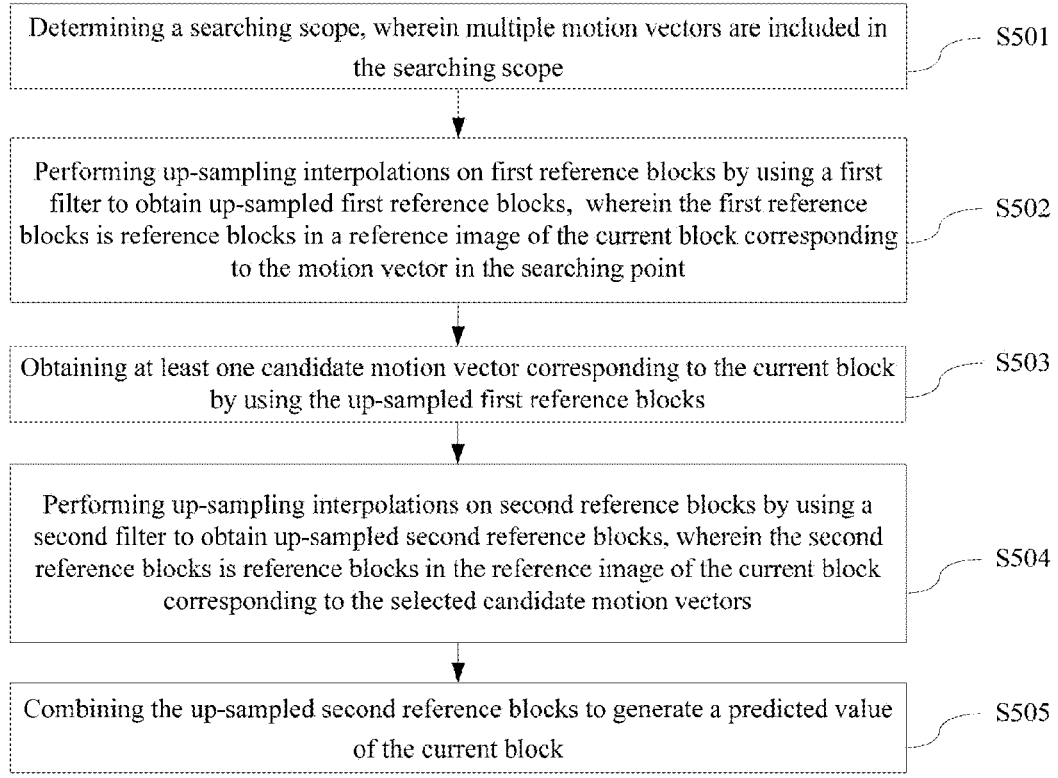
FIG. 5 is a schematic diagram of performing up-sampling interpolations on a reference image by using a filter.

Referring to FIG. 5, in order to further lower the complexity of encoder and decoder, the present invention provides a method for generating a predicted value of an image according to another embodiment, which is used to generate a predicted value of a current block during image encoding, the method comprising the steps of:

S501: determining a searching scope, wherein multiple motion vectors are included in the searching scope.

The searching scope represents a motion vector set to be searched. There exist many approaches for determining a searching scope, and according to one embodiment, a set of candidate motion vectors of the current block is obtained as the searching scope; according to another embodiment, a search starting point of the current template is obtained according to the motion vectors around the current block, and the searching scope is obtained according to the search starting point and a predefined searching region.

S502: performing up-sampling interpolations on first reference blocks by using a first filter to obtain up-sampled first reference blocks, wherein the first reference blocks are reference blocks in a reference image of the current block corresponding to the motion vector in the searching scope.

The reference image refers to a restored image around the image to which the current block belongs, and is used for restoring the current block. The reference image may be a reference frame, or a reference block, or a reference field picture.

The above step may be implemented in various forms. According to one embodiment, up-sampling interpolation could be first performed on the reference image by using a first filter such that a first reference image is obtained; and then the up-sampled first reference blocks corresponding to the motion vectors within the searching scope are obtained in the first reference image.

In another embodiment, first reference blocks corresponding to the motion vectors within the searching scope could be first obtained from a reference image; and then up-sampling interpolation on the first reference blocks is performed using a first filter, to thereby obtain the up-sampled first reference blocks. Up-sampling processing, which is only performed on the reference image blocks corresponding to the position indicated by the motion vectors, may lower the complexity of the algorithm and improve the efficiency.

S503: obtaining at least one candidate motion vector corresponding to the current block by using the up-sampled first reference blocks.

Such step is a process of motion search. A motion search means a matching difference between two blocks corresponding to each searching position in the up-sampled first reference blocks. If two reference images are selected for the current block, during the process of motion search, a matching difference between two up-sampled first blocks corresponding to the two reference images needs to be calculated; and if only one reference image is selected for the current block, during the process of motion search, a current template of the current block and a corresponding reference template in the up-sampled first reference blocks need to be obtained, and then a matching difference between the current template and the reference template is calculated; of course, at the time when two reference images are selected, a combination of the above two matching differences may also be used, that is, a sum of the matching difference between two up-sampled first reference blocks corresponding to the two reference images and the matching difference between the current template and at least one corresponding reference template in the up-sampled first reference blocks is calculated.

The term "motion search" as used herein may be replaced with other terms in different places. For example, such technological terms as matching difference calculation and search matching are almost technologically equivalent to motion search, each of which representing a calculation of a matching difference between two blocks at each search position. A matching difference refers to a parameter of similarity between two reference blocks. In particular, SAD, sum of absolute transformation differences, or sum of absolute square differences, and of course, some other parameters describing the similarity between two reference blocks, may be used.

At least one motion vector of minimum matching difference may be selected as a candidate motion vector.

S504: performing up-sampling interpolations on second reference blocks by using a second filter to obtain up-sampled second reference blocks, wherein the second reference blocks are reference blocks in the reference image of the current block corresponding to the selected candidate motion vectors.

This step may be executed in various forms. In an embodiment, a second filter may be used first to perform up-sampling interpolations on the reference image, to obtain a second reference image; and then from the second reference image, up-sampled second reference blocks corresponding to the motion vectors within the searching scope are obtained.

In another embodiment, second reference blocks corresponding to the motion vectors within the searching scope may be obtained first from the reference image; and then the second filter is used to perform up-sampling interpolations on the second reference blocks, to obtain up-sampled second reference blocks. Up-sampling processing being only performed on the reference image corresponding to the position indicated by the motion vectors may lower the complexity of the algorithm and improve the efficiency.

S505: combining the up-sampled second reference blocks to obtain a predicted value of the current block.

In still another embodiment, the tap number of the first filter is less than that of the second filter.

In the above embodiments, it is possible to lower the complexity of the decoder to a certain extent by using the surrounding known information to perform predictive search, and the use of two filters in performing interpolations on the reference signals at the same time can obtain a reference image with subpixel precision, which leads to an improvement of the performances of the decoder. Furthermore, during a motion search, the use of a filter, which is simpler than the filter used in motion compensation may maintain the properties and lower the complexity of calculation. This meets the requirements on modularization of the design of decoder hardware, reduces the frequencies of reading data, improves the efficiency of data reading, reduces the times of module switching, and makes the template techniques to be applied to the macro block division. Moreover, in the process of up-sampling processing, up-sampling processing being only performed on the reference image corresponding to the position indicated by the motion vectors can lower the complexity of the algorithm and improve the efficiency.

Figure 6:
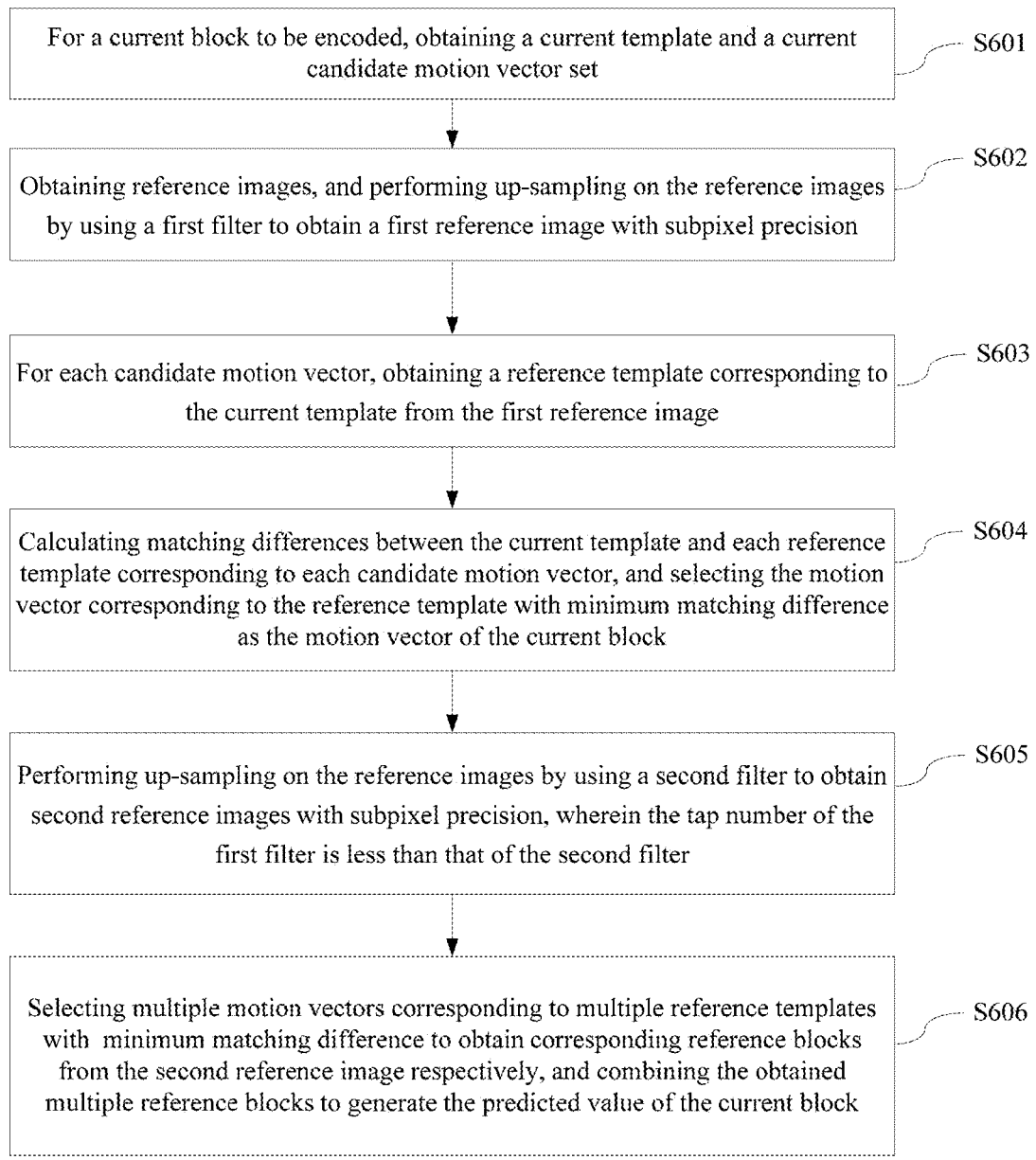
FIG. 6 is a flowchart of a method for generating a predicted value of an image according to another embodiment of the present invention.

Referring to FIG. 6, another embodiment of the method for generating a predicted value of an image provided in the present invention comprises the following steps:

S601: for a current block Curr_Blk to be encoded, obtaining a current template and a current candidate motion vector set.

The current block may be a whole macro block, or one of the divided blocks of a macro block. Here, a whole macro block is taken as an example.

The current template, for example, TM1 shown in FIG. 4, is obtained by using reconstructed pixels around the current block. Candidate motion vectors are constituted by a set of candidate motion vectors obtained by using known motion vectors around the current block, such as MVL, MVU and MVR shown in FIG. 2, and the motion vectors of the same position in the previous and next frames, such as colMV1, colMV2 . . . colMV4, etc.

The candidate motion vector set may comprise motion vectors MVL, MVU and MVR of surrounding blocks spatially related to the current block Curr_Blk and a motion vector mid-value MEAN (MVL, MVU, MVR), motion vectors in the blocks of the same position in a forward reference frame fn−1 and motion vectors in surrounding blocks of the blocks of the same position, and motion vectors in the blocks of the same position in a backward reference frame fn+1 and all or part of motion vectors in surrounding blocks of the blocks of the same position, that is, it comprises a left block, an upper block, a left upper block, a right upper block, of the current block, all or part of a left block, an upper block, a left upper block, a right upper block, of the blocks in the reference frame of the same position as the current block, and the blocks in the reference frame of the same position as the current block.

S602: obtaining reference images, and performing up-sampling on the reference images by using the first filter to obtain a first reference image with subpixel precision, wherein the first filter is a simple filter.

Reference images are obtained, and up-sampling is performed on the reference images by using a simple filter filter1, such as a bilinear filter having a filtering coefficient of [1,1] or a 3-tap filter [1,2,1], to obtain a first reference image with subpixel precision (which may be ½ pixel precision, or ¼ pixel precision, or even ⅛ pixel precision).

Figure 7:
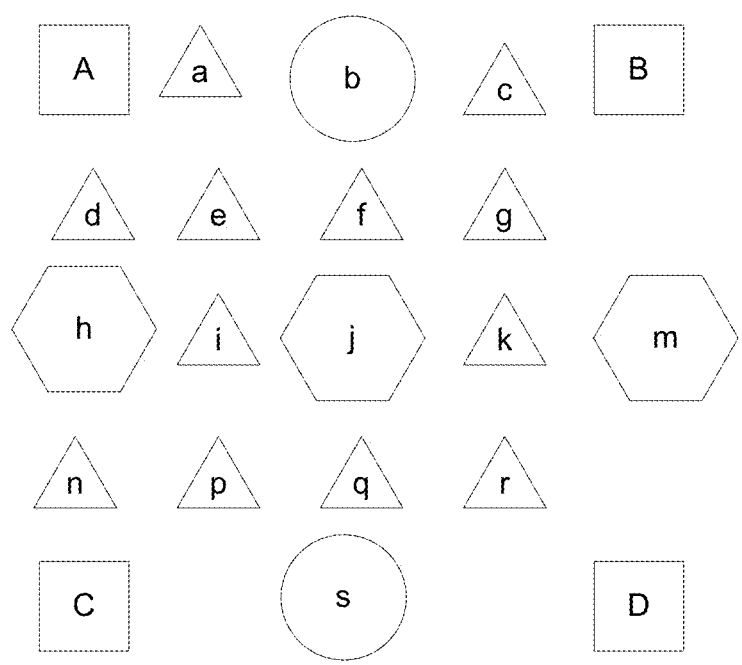
FIG. 7 is a flowchart of a method for generating a predicted value of an image according to another embodiment of the present invention.

The detailed method is shown in FIG. 7, wherein A, B, C, D are selected whole pixel points of the reference image, b, h, j, m, s are ½ pixel points, and a, c, d, e, f, g, i, k, n, p, q, r are ¼ pixel points. First, interpolations are performed on the whole pixel points A, B, C, D of the reference image by using the simple filter filter1 so that the ½ pixel points b, h, j, m, s are obtained, constructing a first reference blocks of ½ pixel precision; next, interpolations are performed on the whole pixel points A, B, C, D and the ½ pixel points b, h, j, m, s by using the simple filter filter1 so that the ¼ pixel points a, c, d, e, f, g, i, k, n, p, q, r are obtained, constructing a first reference blocks of ¼ pixel precision. For example:

$$b=(A+B+1)/2;$$

$$s=(C+D+1)/2;$$

$$j=(b+s+1)/2;$$

S603: for each candidate motion vector, obtaining a reference template corresponding to the current template from the first reference image.

In the obtained first reference blocks, by using the candidate motion vector, the reference template TM2 corresponding to the position indicated by the candidate motion vector or the reference template TM2 corresponding to the neighborhood position of the subpixel distance of the position indicated by the candidate motion vector is found, as shown in FIG. 4.

S604: calculating matching differences between the current template and each reference template corresponding to each candidate motion vector, and selecting the motion vector corresponding to the reference template with minimum matching difference as the motion vector of the current block;

The matching difference refers to a parameter for the similarity between the current template and the reference template. For example, SAD is used to calculate a sum of absolute value difference of the pixel difference between the current block template area and the corresponding area of the reference template, or sum of absolute square differences (SSD) may be used to calculate a sum of square of the pixel difference between the current block template area and the corresponding area of the reference template.

Steps S603 and S604 are repeated for each candidate motion vector in the candidate motion vector set to obtain matching differences cost1, cost2, cost3 . . . between the current template and the reference template to which each candidate motion vector corresponds.

The matching differences cost between TM2 and TM1 obtained through calculation are sequenced, and a motion vector corresponding to a reference template with the minimum matching difference is selected as the motion vector of the current block.

S605: performing up-sampling on the reference images by using a second filter, to obtain second reference blocks with subpixel precision, wherein the tap number of the first filter is less than that of the second filter.

Figure 8:
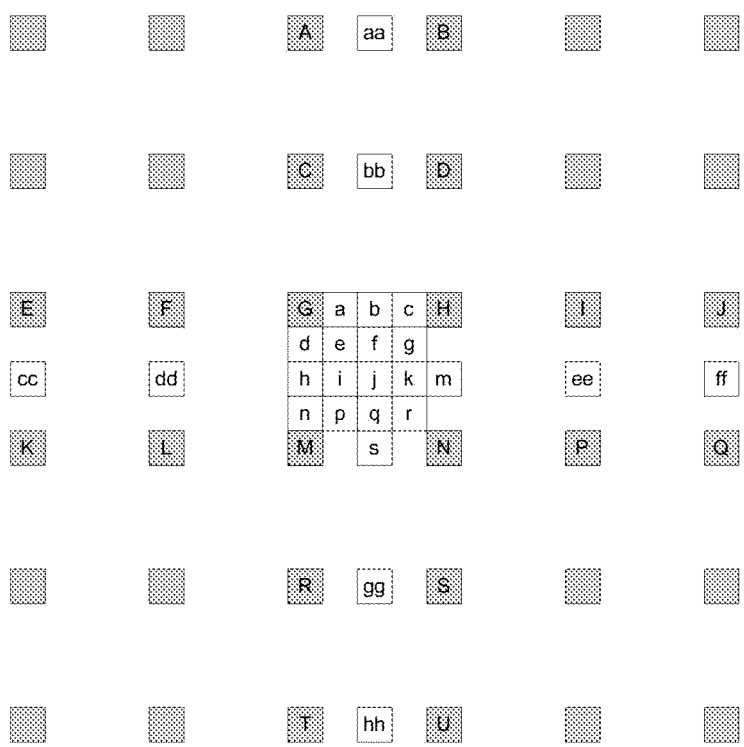
FIG. 8 is a schematic diagram of performing up-sampling interpolations on a reference image by using a simple filter.

A motion compensating filter filter2, such as a 6-tap filter [1, −5, 20, 20, −5, 1] or an adaptive filter in H.264/AVC Standard is used to perform interpolations, as shown in FIG. 3, to generate a second reference image. Referring to FIG. 8, a particular interpolation generating method is as follows:

First, ½ pixel points are generated by using whole pixel points A, B, C, D, E, F, G, H, I, J, K, L, M, N, P, Q, R, S, T, U through the motion compensating filter filter2. Afterwards, ¼ pixel points are generated by using the whole pixel points and the ½ pixel points to obtain reference blocks with subpixel precision.

S606: selecting at least one motion vector corresponding to at least one reference template with minimum matching difference to obtain corresponding up-sampled second reference blocks from the second reference image respectively, and combining the obtained at least one up-sampled second reference block to obtain the predicted value of the current block.

The at least one motion vector corresponding to the minimum matching difference is the candidate motion vector.

Multiple motion vectors corresponding to the first several (for example, 4) minimum matching differences cost between TM2 and TM1 are selected, and the corresponding reference blocks trueRef are found from the second reference image. These reference blocks are combined to generate the predicted value pred of the current block. For example, an average value of the four predicted values of the minimum matching difference is taken as the predicted value of the current block, to predict the current block.

In another embodiment, in order to lower the complexity of processing, it is unnecessary to perform up-sampling on the whole reference image, and up-sampling may only be performed on part of the reference image containing the content corresponding to the candidate motion vector. This embodiment comprises the following steps:

S6011: for a current block Curr_Blk to be encoded, obtaining a current template and current candidate motion vectors.

The detailed procedure for this step is similar to that of the last embodiment.

S6021: obtaining reference image, obtaining first reference blocks corresponding to the candidate motion vectors from the reference image, and performing up-sampling on the first reference blocks by using a first filter, to obtain a first reference image with subpixel precision, wherein the first filter is a simple filter.

Reference images are obtained. Then, the first reference blocks corresponding to the candidate motion vectors are obtained from the reference images, and up-sampling is performed on the first reference blocks by using a simple filter filter1, such as a bilinear filter having a filtering coefficient of [1,1] or a 3-tap filter [1,2,1], to obtain a first reference image with subpixel precision (which may be ½ pixel precision, or ¼ pixel precision, or even ⅛ pixel precision).

The detailed method is shown in FIG. 5, wherein A, B, C, D are selected whole pixel points of the first reference blocks, b, h, j, m, s are ½ pixel points, and a, c, d, e, f, g, i, k, n, p, q, r are ¼ pixel points. First, interpolations are performed on the whole pixel points A, B, C, D of the first reference blocks by using the simple filter filter1 so that the ½ pixel points b, h, j, m, are obtained, constructing up-sampled first reference blocks of ½ pixel precision; next, interpolations are performed on the whole pixel points A, B, C, D and the ½ pixel points b, h, j, m, s by using the simple filter filter1 so that the ¼ pixel points a, c, d, e, f, g, i, k, n, p, q, r are obtained, constructing up-sampled first reference blocks of ¼ pixel precision. For example:

$b=(A+B+1)/2;$ $s=(C+D+1)/2;$ $j=(b+s+1)/2;$

S6031: for each candidate motion vector, obtaining a reference template corresponding to the current template from the up-sampled first reference blocks.

In the obtained first reference blocks, by using the candidate motion vector, the reference template corresponding to the position indicated by the candidate motion vector, or the reference template TM2 corresponding to the neighborhood position of the subpixel distance of the position indicated by the candidate motion vector is found, as shown in FIG. 4.

S6041: calculating matching differences each between the current template and each reference template, and selecting the motion vector corresponding to the reference template with minimum matching difference as the motion vector of the current block;

S6051: selecting at least one motion vector corresponding to at least one reference template with minimum matching difference, and obtaining corresponding second reference blocks from the reference images respectively.

The at least one motion vector corresponding to the minimum matching difference is the candidate motion vector.

S6061: performing up-sampling on the second reference blocks by using a second filter, to obtain second reference blocks with subpixel precision, combining the at least one obtained second reference block to obtain the predicted value of the current block, wherein the tap number of the first filter is less than that of the second filter.

Interpolations are performed by using a motion compensating filter filter2, such as a 6-tap filter [1, −5, 20, 20, −5, 1] or an adaptive filter in H.264/AVC Standard, to generate up-sampled second reference blocks. With referring to FIG. 8, a particular interpolation generating method is as follows: generating ½ pixel points by using whole pixel points A, B, C, D, E, F, G, H, I, J, K, L, M, N, P, Q, R, S, T, U through the motion compensating filter filter2, and then generating ¼ pixel points by using the whole pixel points and the ½ pixel points, to obtain the second reference blocks with subpixel precision.

These up-sampled second reference blocks are combined to generate the predicted value pred of the current block. For example, an average value of the four up-sampled second reference blocks is taken as the predicted value of the current block, so as to predict the current block.

The method may be applicable to an encoder, or to a decoder. For the encoder, after the predicted value of the current block is obtained, a residual value between the current block and the predicted value is calculated, and then transmitted to the decoder after being encoded. For the decoder, a restored value of the current block is obtained by adding the residual value of the current block obtained through decoding and the combined predicted value pred of the current block.

In accordance with this embodiment, during a motion search, the use of filter, which is simpler than the filter used in motion compensation, may maintain the properties and lower the complexity of calculation. Also, it is possible to lower complexity without compromising the precision, which is achieved by obtaining the candidate motion vector required for the motion compensation process using the matching difference between the current template and the reference template during the motion search process, and by performing predictive search using the surrounding known information. Moreover, in the process of up-sampling, up-sampling is performed only on the reference blocks corresponding to a position indicated by the motion vectors, which leads to a simpler algorithm and higher efficiency.

Figure 9:
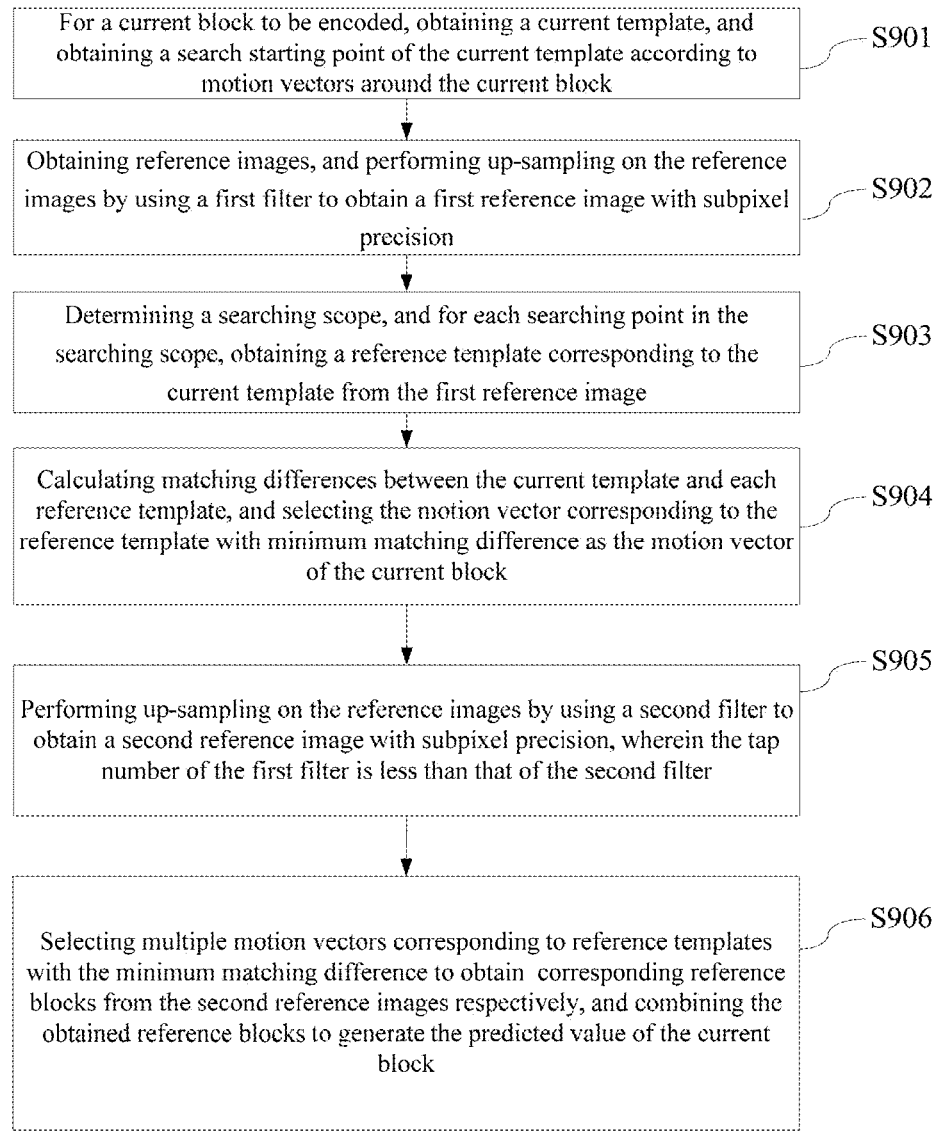
FIG. 9 is a structure for implementing a method for generating a predicted value of an image according to another embodiment of the present invention.

Referring to FIG. 9, another embodiment of the method for generating a predicted value of an image provided in the present invention comprises the following steps:

S901: for a current block Curr_Blk to be encoded, obtaining a current template, and obtaining a search starting point of the current template according to motion vectors around the current block.

The current template, for example, TM1 as shown in FIG. 4, is obtained by using reconstructed pixels around the current block. And a search starting point of the current template is obtained by using known motion vectors around the current block, such as MVL, MVU and MVR shown in FIG. 3.

S902: obtaining reference images, and performing up-sampling on the reference images by using a first filter to obtain a first reference image with subpixel precision, wherein the first filter is a simple filter.

The reference images are obtained, and a first reference image with subpixel precision (which may be ½ pixel precision, or ¼ pixel precision, or even ⅛ pixel precision) is obtained by performing up-sampling on the reference image using a simple filter filter1, such as a bilinear filter having a filtering coefficient of [1,1]. The detailed method is shown in FIG. 7, wherein A, B, C, D are selected whole pixel points of the reference image, b, h, j, m, s are ½ pixel points, and a, c, d, e, f, g, i, k, n, p, q, r are ¼ pixel points. First, interpolations are performed on the whole pixel points A, B, C, D of the reference image by using the simple filter filter1 so that the ½ pixel points b, h, j, m, s are obtained, constructing a first reference blocks of ½ pixel precision; next, interpolations are performed on the whole pixel points A, B, C, D and the ½ pixel points b, h, j, m, s by using the simple filter filter1 so that the ¼ pixel points a, c, d, e, f, g, i, k, n, p, q, r are obtained, constructing a first reference blocks of ¼ pixel precision. For example:

$$b=(A+B+1)/2;$$

$$s=(C+D+1)/2;$$

$$j=(b+s+1)/2;$$

S903: determining a searching scope, and for each searching point in the searching scope, obtaining a reference template corresponding to the current template from the first reference image.

The searching scope is determined according to the search starting point and a predefined searching region, and a reference template TM2 corresponding to each searching point in the searching scope is found from the obtained first reference image. The searching scope is determined by the search starting point and a predefined searching region, and the searching region is determined through negotiation between an encoder and a decoder. According to one example, an encoder determines the searching region and transmits the searching region to a decoder. For another example, an encoder and a decoder are configured with an identical searching region in advance.

S904: calculating matching differences between the current template and each reference template, and selecting the motion vector corresponding to the reference template with minimum matching difference as the motion vector of the current block.

In particular, sum of absolute differences (SAD), sum of absolute transformation differences, or sum of absolute square differences, and of course, some other parameters describing the similarity between two reference blocks, may be used.

The matching differences cost between TM2 and TM1 obtained through calculation are sequenced, and a motion vector corresponding to a reference template with the minimum matching difference is selected as the motion vector of the current block.

S905: performing up-sampling on the reference images by using the second filter to obtain a second reference image with subpixel precision, wherein the tap number of the first filter is less than that of the second filter.

Interpolations are performed by using a motion compensating filter filter2, such as a 6-tap filter [1, −5, 20, 20, −5, 1] or an adaptive filter in H.264/AVC Standard, to generate true reference blocks trueRef. A particular interpolation generating method is as follows:

generating ½ pixel points by using whole pixel points A, B, C, D, E, F, G, H, I, J, K, L, M, N, P, Q, R, S, T, U through the motion compensating filter filter2, then generating ¼ pixel points by using the whole pixel points and the ½ pixel points, and finally obtaining the reference blocks with subpixel precision by using the whole pixel points, the ½ pixel points as well as the ¼ pixel points.

S906: selecting multiple motion vectors corresponding to reference templates with the minimum matching difference to obtain corresponding reference blocks from the second reference image respectively, and combining the obtained reference blocks to generate the predicted value of the current block.

At least one motion vector corresponding to the minimum matching difference is the candidate motion vector. Motion vectors corresponding to the first several (for example, 4) minimum matching differences cost of TM2 and TM1 are selected, and corresponding reference blocks trueRef are found from the second reference image. These reference blocks are combined to generate the predicted value pred of the current block. For example, an average value of the four predicted values of minimum matching difference is taken as the predicted value of the current block, so as to predict the current block.

In order to lower the complexity of processing, it is unnecessary to perform up-sampling on the whole reference image, and up-sampling may only be performed on part of the reference image containing the content corresponding to the candidate motion vector.

In another embodiment, the steps S902 and S903 may be substituted by the following steps:

S9021: obtaining first reference blocks corresponding to the candidate motion vectors from the reference images, and performing up-sampling interpolations on the first reference blocks to obtain the up-sampled first reference blocks.

The detailed up-sampling process is similar to the step S902.

S9031: for each candidate motion vector, obtaining a reference template corresponding to the current template from the up-sampled first reference blocks;

The detailed up-sampling process is similar to the step S903.

In another embodiment, the steps S905 and S906 may be substituted by the following steps:

S9051: selecting at least one candidate motion vector corresponding to at least one reference template with minimum matching difference, to obtain second reference blocks corresponding to the candidate motion vectors from the reference images, and performing up-sampling interpolations on the second reference blocks by using a second filter to obtain the up-sampled second reference blocks;

The detailed up-sampling process is similar to the step S905.

S9061: combining the obtained at least one up-sampled second reference block to generate the predicted value of the current block.

The detailed up-sampling process is similar to the step S906.

The method may be applicable to an encoder, or to a decoder. For the encoder, after the predicted value of the current block is obtained, a residual value between the current block and the predicted value is calculated, and then transmitted to the decoder after being encoded. For the decoder, a restored value of the current block is obtained by adding the residual value of the current block obtained through decoding and the combined predicted value pred of the current block.

In accordance with this embodiment, during a motion search, the use of filter, which is simpler than the filter used in motion compensation, may maintain the properties and lower the complexity of calculation. Also, it is possible to lower complexity without compromising the precision, which is achieved by obtaining the candidate motion vector required for the motion compensation process using the matching difference between the current template and the reference template during the motion search process, and by performing predictive search using the surrounding known information. Moreover, in the process of up-sampling, up-sampling is performed only on the reference blocks corresponding to a position indicated by the motion vectors, which leads to a simpler algorithm and higher efficiency.

Figure 10:
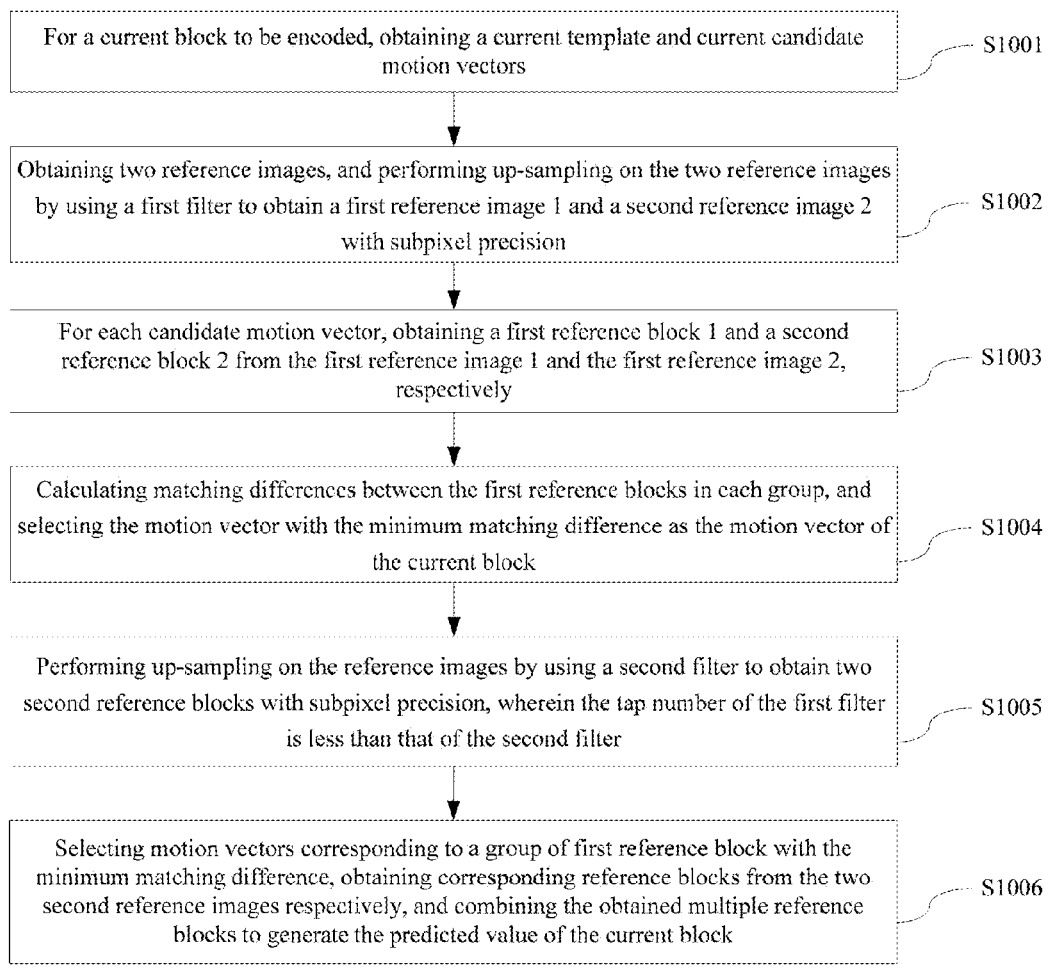
FIG. 10 is a structure for implementing a method for generating a predicted value of an image according to another embodiment of the present invention.

Referring to FIG. 10, the method for generating a predicted value of an image provided in the present invention comprises the following steps:

S1001: for a current block Curr_Blk needed to be encoded, obtaining a current template and current candidate motion vectors.

The current template, for example, TM1 as shown in FIG. 4, is obtained by using reconstructed pixels around the current block. Candidate motion vectors are constituted by using known motion vectors around the current block, such as MVL, MVU and MVR shown in FIG. 3, and the motion vectors of the same positions in the previous and next frames, such as colMV1, colMV2 . . . colMV4, etc.

S1002: obtaining two reference images, and performing up-sampling on the reference images by using a first filter to obtain a first reference image 1 and a first reference image 2 with subpixel precision, wherein the first filter is a simple filter.

Two reference images of the current block are obtained, namely, a forward reference image and a backward reference image. Up-sampling is performed on these two reference images by using a simple filter filter1, such as a bilinear filter having a filtering coefficient of [1,1], to obtain a virtual reference image with subpixel precision (which may be ½ pixel precision, or ¼ pixel precision, or even ⅛ pixel precision). The detailed up-sampling interpolation method is shown in FIG. 8, wherein A, B, C, D are selected whole pixel points of the reference image, b, h, j, m, s are ½ pixel points, and a, c, d, e, f, g, i, k, n, p, q, r are ¼ pixel points. First, interpolations are performed on the whole pixel points A, B, C, D of the reference image by using the simple filter filter1 so that the ½ pixel points b, h, j, m, s are obtained, constructing a first reference blocks of ½ pixel precision; next, interpolations are performed on the whole pixel points A, B, C, D and the ½ pixel points b, h, j, m, s by using the simple filter filter1 so that the ¼ pixel points a, c, d, e, f, g, i, k, n, p, q, r are obtained, constructing a first reference blocks of ¼ pixel precision. In this way, a first reference image 1 virtualRef1 is obtained. A first reference image 2 virtualRef2 is obtained in the same manner.

S1003: for each candidate motion vector, obtaining an up-sampled first reference block 1 and an up-sampled first reference block 2 from the first reference image 1 and the first reference image 2, respectively.

For each candidate motion vector, an up-sampled first reference blocks 1 and an up-sampled first reference blocks 2 are obtained from the first reference image 1 and the first reference image 2, respectively. The up-sampled first reference block 1 and first reference block 2 corresponding to each candidate motion vector is a group of up-sampled first reference blocks.

From the obtained first reference block 1 virtualRef1, by using a candidate motion vector, the up-sampled first reference block 1 corresponding to the position indicated by the candidate motion vector, or an up-sampled first reference block 1 virBlk1 corresponding to the neighborhood position of the subpixel distance of the position indicated by the candidate motion vector is found. Further, a first reference block 2 virBlk2 is obtained at a symmetrical position on another reference image virtualRef2. A matching difference cost between the first reference block 1 virBlk1 and the first reference block 2 virBlk2. In particular, SAD, sum of absolute transformation differences, or sum of absolute square differences, and of course, some other parameters describing the similarity between two reference blocks, may be used.

Moreover, the reference templates in the current block and in the first reference image may be calculated, the matching difference between the current block and the reference block and the matching difference between the current template and the reference template may be calculated, and an overall matching difference cost is obtained by calculating the sum of the two matching differences.

S1004: calculating matching differences between the up-sampled first reference blocks in each group, and selecting the motion vector with the minimum matching difference as the motion vector of the current block.

The matching differences between the up-sampled first reference blocks obtained through calculation are sequenced, and a motion vector corresponding to a reference template with the minimum matching difference is selected as the motion vector of the current block.

S1005: performing up-sampling on the reference images by using a second filter to obtain second reference blocks with subpixel precision, wherein the tap number of the first filter is less than that of the second filter.

True reference blocks trueRef are generated by performing interpolations using a motion compensating filter filter2, such as a 6-tap filter [1, −5, 20, 20, −5, 1] in H.264/AVC Standard. A particular interpolation generating method is as follows:

generating ½ pixel points by the motion compensating filter filter2 by using whole pixel points A, B, C, D, E, F, G, H, I, J, K, L, M, N, P, Q, R, S, T, U, and then generating ¼ pixel points by using the whole pixel points and the ½ pixel points, and finally obtaining reference blocks with subpixel precision by using the whole pixel points, the ½ pixel points as well as the ¼ pixel points.

S1006: selecting a motion vector corresponding to a group of up-sampled first reference blocks with the minimum matching difference, obtaining corresponding up-sampled second reference blocks from the two second reference images respectively, and combining the obtained multiple up-sampled second reference blocks to generate the predicted value of the current block.

The at least one motion vector corresponding to the minimum matching difference is the candidate motion vector. The motion vector corresponding to the minimum matching difference cost from the virBlk1 and virBlk2 is selected, and corresponding up-sampled second reference blocks fn−1 and fn+1 are found from the second reference images to be combined to generate a predicted value pred.

In a case where the distance from the forward predicted frame fn−1 to the current frame fn is equal to the distance from the backward predicted frame fn+1 to the current frame fn, the predicted value of the current block curr_blk may be obtained in the equation (1) below:

$$f_n(x, y) = \left\{ f_{n-1}\left(x - \frac{1}{2}u, y - \frac{1}{2}v\right) + f_{n+1}\left(x + \frac{1}{2}u, y + \frac{1}{2}v\right) \right\} \Big/ 2 \quad (1)$$

where u and v are a horizontal component and a vertical component of the motion vector, respectively, and x and y are horizontal coordinate position and vertical coordinate position of the current block, respectively.

In a case where the distance from the forward predicted frame fn−1 to the current frame fn is not equal to the distance from the backward predicted frame fn+1 to the current frame fn, the predicted value of the current block curr_blk may be obtained in the equation (2) below:

$$f_n(x, y) = \left\{ d2 * f_{n-1}\left(x - \frac{d1}{d1+d2}u, y - \frac{d1}{d1+d2}v\right) + d1 * f_{n+2}\left(x + \frac{d2}{d1+d2}u, y + \frac{d2}{d1+d2}v\right) \right\} \Big/ (d1+d2) \quad (2)$$

where d1 is a temporal distance from fn−1 to fn, d2 is a temporal distance from fn+1 to fn; and u and v are a horizontal component and a vertical component of the motion vector, respectively, and x and y are horizontal coordinate position and vertical coordinate position of the current block, respectively.

In another embodiment, in order to lower the complexity of processing, it is unnecessary to perform up-sampling on the whole reference image, and up-sampling may only be performed on the part of the reference image containing the content corresponding to the candidate motion vector. This method comprises:

S1001': for a current block Curr_Blk needed to be encoded, obtaining a current template and current candidate motion vectors.

S1002': obtaining two reference images, and for each candidate motion vector, obtaining a first reference image 1 and a first reference image 2 from the two reference images.

S1003': performing up-sampling on the first reference image 1 and first reference image 2 by using a first filter, to obtain up-sampled first reference block 1 and up-sampled first reference block 2, wherein the first filter is a simple filter.

The up-sampled first reference block 1 and up-sampled first reference block 2 corresponding to each candidate motion vector is a group of up-sampled first reference blocks.

S1004': calculating matching differences between the up-sampled first reference blocks in each group, and selecting the motion vector corresponding to the minimum matching difference as the motion vector of the current block.

The matching differences between the up-sampled first reference blocks obtained through calculation are sequenced, and a motion vector corresponding to a reference template with minimum matching difference as the motion vector of the current block.

S1005': selecting motion vectors corresponding to a group of up-sampled first reference blocks with the minimum matching difference, to obtain corresponding second reference blocks respectively from the two reference images, and performing up-sampling on the second reference images by using a second filter to obtain two up-sampled second reference blocks, wherein the tap number of the first filter is less than that of the second filter.

And the motion vector corresponding to the minimum matching difference is the candidate motion vector.

Interpolations are performed by using a motion compensating filter filter2, such as a 6-tap filter [1, −5, 20, 20, −5, 1] in H.264/AVC Standard to generate true reference blocks trueRef, as shown in FIG. 3. A particular interpolation generating method is as follows:

generating ½ pixel points by using whole pixel points A, B, C, D, E, F, G, H, I, J, K, L, M, N, P, Q, R, S, T, U through the motion compensating filter filter2, and then generating ¼ pixel points by using the whole pixel points and the ½ pixel points, so as to obtain reference blocks with subpixel precision.

S1006': combining the obtained multiple up-sampled second reference blocks to generate the predicted value of the current block.

A motion vector corresponding to the minimum matching difference cost between the virBlk1 and virBlk2 is selected, and corresponding second reference blocks are found from the reference image, and the second reference blocks are up-sampled to obtain up-sampled second reference blocks fn−1 and fn+1, which are then combined to generate the predicted value pred.

The method may be applicable to an encoder, or to a decoder. For the encoder, after the predicted value of the current block is obtained, a residual value between the current block and the predicted value is calculated, and then transmitted to the decoder after being encoded. For the decoder, a restored value of the current block is obtained by adding the residual value of the current block obtained through decoding and the combined predicted value pred of the current block.

In accordance with this embodiment, during a motion search, the use of filter, which is simpler than the filter used in motion compensation, may maintain the properties and lower the complexity of calculation. Also, it is possible to lower complexity without compromising the precision, which is achieved by obtaining the candidate motion vector required for the motion compensation process using the matching difference between the current template and the reference template during the motion search process, and by performing predictive search using the surrounding known information. Moreover, in the process of up-sampling, up-sampling is performed only on the reference blocks corresponding to a position indicated by the motion vectors, which leads to a simpler algorithm and higher efficiency.

Figure 11:
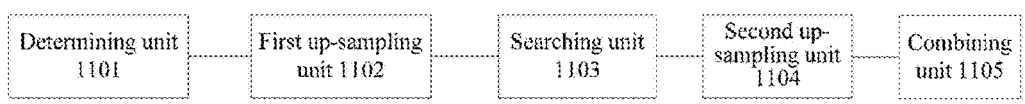
FIG. 11 is a block diagram of a device for generating a predicted value of an image according to an embodiment of the present invention.

With reference to FIG. 11, an embodiment of the device for generating a predicted value of an image provided by the present invention is shown, the device comprising: a determining unit 1101, configured to determine a searching scope, wherein multiple motion vectors are included in the searching scope; a first up-sampling unit 1102, configured to perform up-sampling interpolations on first reference blocks by using a first filter to obtain up-sampled first reference blocks, wherein the first reference blocks are reference blocks in a reference image of the current block corresponding to the motion vector in the searching scope; a motion searching unit 1103, configured to obtain at least one candidate motion vector corresponding to the current block by using the up-sampled first reference blocks; a second up-sampling unit 1104, configured to perform up-sampling interpolations on second reference blocks by using a second filter to obtain up-sampled second reference blocks, wherein the second reference blocks are reference blocks in the reference image of the current block corresponding to the at least one candidate motion vector; and a combining unit 1105, configured to combine the up-sampled second reference blocks to generate a predicted value of the current block.

In another embodiment, the tap number of the first filter is less than that of the second filter. In particular, for example, the first filter is a bilinear filter, and the second filter is a 6-tap filter or an adaptive filter.

In an embodiment, the determining unit is configured to determine a candidate motion vector set of the current block, and to take the determined candidate motion vector set as the searching scope. And in another embodiment, the determining unit comprises: a search starting point determining unit configured to obtain a search starting point of a current template; and an obtaining unit configured to obtain the searching scope according to the search starting point and a predefined searching region.

Figure 12:
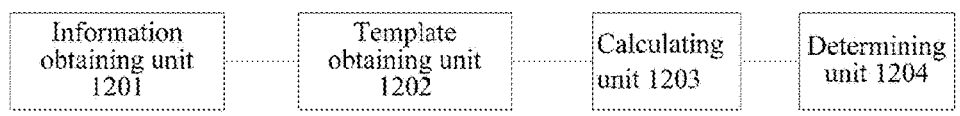
FIG. 12 is a block diagram of a motion searching unit according to an embodiment of the present invention.

With reference to FIG. 12, an embodiment of the motion searching unit comprises: an information obtaining unit 1201, configured to obtain a current template of the current block; a template obtaining unit 1202, configured to, for each candidate motion vector, obtain a reference template corresponding to the current template from the up-sampled first reference blocks; a calculating unit 1203, configured to calculate matching differences between the current template and each reference template, respectively; and a determining unit 1204, configured to select at least one motion vector corresponding to at least one reference template with minimum matching difference, and to take the selected at least one motion vector as the candidate motion vector of the current block.

Another embodiment of the motion searching unit comprises: an information obtaining unit configured to obtain a current template of the current block; a template obtaining unit configured to, for each searching point in the searching scope, obtain a reference template corresponding to the current template from the up-sampled first reference blocks; a calculating unit configured to calculate matching differences between the current template and each reference template, respectively; and a determining unit configured to select at least one motion vector corresponding to at least one reference template with minimum matching difference, and to take the selected at least one motion vector as the candidate motion vector of the current block.

Figure 13:
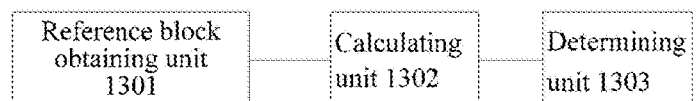
FIG. 13 is a block diagram of a motion searching unit according to another embodiment of the present invention.

With reference to FIG. 13, still another embodiment of the motion searching unit comprises: a reference block obtaining unit 1301 configured to, for each candidate motion vector, obtain two up-sampled first reference blocks; a calculating unit 1302 configured to calculate a matching difference of each group of the up-sampled first reference blocks; and a determining unit 1303 configured to select a motion vector corresponding to the up-sampled first reference blocks with a minimum matching difference, and to take the selected motion vector as the candidate motion vector of the current block.

The device may be applied to a decoder or an encoder, and the encoder further comprises: an encoding unit configured to calculate a residual value between the current block and the predicted value, and transmit the residual value to a decoder after encoding.

The decoder further comprises: a decoding unit configured to decode the obtained residual value of the current block, and to obtain a restored value of the current block by adding the residual value of the current block to the predicted value of the current block.

The first up-sampling unit and second up-sampling unit may perform up-sampling on the whole reference image, and then obtain up-sampled reference blocks corresponding to the motion vectors in the searching scope; alternatively, the first up-sampling unit and second up-sampling unit may also find reference blocks corresponding to the motion vectors in the searching scope, and then obtain up-sampled reference blocks by performing up-sampling on the reference blocks.

The implementation details of the embodiments of the method explained in the description are also applicable to the implementation details of the embodiments of the device.

The embodiments of the method and device may be applicable to an encoder or a decoder. According to these embodiments, during a motion search, a filter that is simpler than that used in a motion compensation process can maintain the properties and lower the complexity of calculation. In the process of motion search, a matching difference between two reference blocks corresponding to reference images is used to obtain the candidate motion vector needed in the process of motion compensation, and a predictive search is performed by using the known information around the current block, lowering the complexity without compromising the accuracy. Furthermore, in the process of up-sampling, up-sampling processing is performed on the reference image corresponding to the position indicated by the motion vectors, which can lower the complexity of the algorithm and improve the efficiency of processing.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. The general purpose processor may be a microprocessor, but in the alternative, the processor may be any conventional processor, controller, microcontroller, or state machine. The processor may also be implemented as a combination of computing devices, e.g., a combination of a DSP and a microprocessor, a plurality of microprocessors, one or more microprocessors in conjunction with a DSP core, or any other such configuration.

It may be understood by an ordinary skilled person in the art that all or part of the processes of the embodiments of the method may be implemented by related hardware under instructions of a computer program stored in a computer-readable storage medium. The execution of the program may comprise the processes of the above embodiments of the method. The storage medium may be one of a floppy disk, a compact disc (CD), a read only memory (ROM), or a random access memory (RAM), etc.

The embodiments of the method and device may be applicable to an encoder or a decoder. The method and device of the embodiments of the present invention may be applicable to various electronic devices or devices related to them, for example, a mobile phone, a wireless device, a personal digital assistant (PDA), a hand-held or portable computer, a global positioning system (GPS) receiver/navigator, a still camera, an audio/video player, a video camera, a video recorder, or a monitoring device, etc.

What are described above are embodiments of the present invention, and those skilled in the art may make various modifications or variants to the present invention according to the disclosure of this application without departing from the spirits and scope of the present invention.

What is claimed is:

1. A method for generating a predicted value of an image comprising:

determining a searching scope based on known motion vectors around the current block, wherein the searching scope represents searched set of known motion vectors neighboring the current block;

wherein determining a searching scope comprises obtaining a candidate motion vector set of the current block as the searching scope;

performing up-sampling interpolations on first reference blocks by using a first filter to obtain up-sampled first reference blocks, wherein the first reference blocks comprise reference blocks in a reference image of a current block corresponding to the motion vector in the searching scope, and wherein the reference images are reconstructed images around the image to which the current block belongs;

obtaining at least one candidate motion vector corresponding to the current block by using the up-sampled first reference blocks, comprising:

obtaining a current template by the reconstruction neighboring the current block;

obtaining, for each motion vector in the searching scope, a reference template to which the current template corresponds, from the up-sampled first reference blocks;

calculating respectively matching differences between the current template and each reference template; and selecting at least one motion vector corresponding to at least one reference template with minimum matching difference as the candidate motion vector corresponding to the current block;

performing up-sampling interpolations on second reference blocks by using a second filter to obtain up-sampled second reference blocks, wherein the second reference blocks comprise reference blocks in the reference image of the current block corresponding to the at least one candidate motion vector; and combining the up-sampled second reference blocks to generate a predicted value of the current block during image encoding or decoding, wherein the predicted value is an average value of the up-sampled second reference blocks pointed by the candidate motion vector which is determined by the up-sampled first reference blocks.

2. The method according to claim 1, wherein a tap number of the first filter is less than a tap number of the second filter.

3. The method according to claim 2, wherein the first filter is a bilinear filter, and wherein the second filter is a 6-tap filter or an adaptive filter.

4. The method according to claim 1, wherein obtaining at least one candidate motion vector corresponding to the current block by using the up-sampled first reference blocks comprises:

calculating, for each candidate motion vector, matching difference between up-sampled first reference blocks in a corresponding group, wherein the number of the reference images is 2, and the number of the up-sampled first reference blocks is also 2; and selecting a motion vector corresponding to a group of up-sampled first reference blocks with minimum matching difference as the candidate motion vector corresponding to the current block.

5. The method according to claim 1, wherein obtaining at least one candidate motion vector corresponding to the current block by using the up-sampled first reference blocks comprises:

calculating, for each candidate motion vector, matching difference between the up-sampled first reference blocks in a corresponding group, wherein the number of the reference images is 2, and the number of the up-sampled first reference blocks is also 2;

calculating, for each candidate motion vector, matching difference between the current template and a reference template corresponding to the current template and obtained from the at least one up-sampled first reference block; and selecting a motion vector corresponding to a group of the up-sampled first reference blocks in which a combination of the sum of the two matching differences are minimum, and taking the selected motion vector as the candidate motion vector corresponding to the current block.

6. The method according to claim 1, wherein determining a searching scope comprises:

obtaining a search starting point of a current template according to motion vectors around the current block; and obtaining the searching scope according to the search starting point and a predefined searching region.

7. The method according to claim 6, wherein obtaining at least one candidate motion vector corresponding to the current block by using the up-sampled first reference blocks comprises:

obtaining a current template;

obtaining, for each motion vector in the searching scope, a reference template to which the current template corresponds, from the up-sampled first reference blocks;

calculating respectively matching differences between the current template and each reference template; and selecting at least one motion vector corresponding to at least one reference template with minimum matching difference as the candidate motion vector corresponding to the current block.

8. The method according to claim 1, wherein performing up-sampling interpolations on first reference blocks by using a first filter to obtain up-sampled first reference blocks comprises:

performing up-sampling interpolations on the reference image by using the first filter to obtain a first reference image; and obtaining, from the first reference image, the up-sampled first reference blocks corresponding to the motion vectors in the searching scope.

9. The method according to claim 1, wherein performing up-sampling interpolations on first reference blocks by using a first filter to obtain up-sampled first reference blocks comprises:

obtaining, from the reference image, first reference blocks corresponding to the motion vectors in the searching scope; and performing up-sampling interpolations on the first reference blocks by using the first filter to obtain the up-sampled first reference blocks.

10. The method according to claim 1, wherein performing up-sampling interpolations on second reference blocks by using a second filter to obtain up-sampled second reference blocks comprises:

performing up-sampling interpolations on the reference image by using the second filter to obtaining a second reference image;

obtaining, from the second reference image, the up-sampled second reference blocks corresponding to the candidate motion vector, and wherein the second reference blocks comprise reference blocks in the reference image of the current block corresponding to the at least one candidate motion vector.

11. The method according to claim 1, wherein performing up-sampling interpolations on second reference blocks by using a second filter to obtain up-sampled second reference blocks comprises:

obtaining, from the reference image, second reference blocks corresponding to the candidate motion vector;

performing up-sampling interpolations on the second reference blocks by using the second filter to obtain the up-sampled second reference blocks, and wherein the second reference blocks comprise reference blocks in the reference image of the current block corresponding to the at least one candidate motion vector.

12. A device for generating a predicted value of an image comprising:

a determining unit configured to determine a searching scope based on known motion vectors around the current block, wherein the searching scope represents searched set of known motion vectors neighboring the current block;

wherein the determining unit is configured to obtain a candidate motion vector set of the current block as the searching scope;

a first up-sampling unit configured to perform up-sampling interpolations on first reference blocks by using a first filter to obtain up-sampled first reference blocks, wherein the first reference blocks comprise reference blocks in a reference image of a current block corresponding to the motion vector in the searching scope;

a motion searching unit configured to obtain at least one candidate motion vector corresponding to the current block by using the up-sampled first reference blocks, wherein the motion searching unit comprises:

an information obtaining unit configured to obtain a current template of the current block by the reconstruction neighboring the current block;

a template obtaining unit configured to, for each candidate motion vector, obtain a reference template corresponding to the current template from the up-sampled first reference blocks;

a calculating unit configured to calculate respectively matching differences between the current template and each reference template; and a determining unit configured to select at least one motion vector corresponding to at least one reference template with minimum matching difference as the candidate motion vector of the current block;

a second up-sampling unit configured to perform up-sampling interpolations on second reference blocks by using a second filter to obtain up-sampled second reference blocks, wherein the second reference blocks comprise reference blocks in the reference image of the current block corresponding to the at least one candidate motion vector; and a combining unit configured to combine the up-sampled second reference blocks to generate a predicted value of the current block during image encoding or decoding, wherein the predicted value is an average value of the up-sampled second reference blocks pointed by the candidate motion vector which is determined by the up-sampled first reference blocks.

13. The device according to claim 12, wherein a tap number of the first filter is less than a tap number of the second filter.

14. The device according to claim 13, wherein the first filter is a bilinear filter, and wherein the second filter is a 6-tap filter or an adaptive filter.

15. The device according to claim 12, wherein the motion searching unit comprises:

a reference block obtaining unit configured to, for each candidate motion vector, obtain two up-sampled first reference blocks;

a calculating unit configured to calculate respectively matching difference of each group of the up-sampled first reference blocks; and a determining unit configured to select a motion vector corresponding to the up-sampled first reference blocks with minimum matching difference as the candidate motion vector of the current block.

16. The device according to claim 12, wherein the determining unit comprises:

a search starting point determining unit configured to obtain a search starting point of a current template; and an obtaining unit configured to obtain the searching scope according to the search starting point and a predefined searching region.

17. The device according to claim 16, wherein the motion searching unit comprises:

an information obtaining unit configured to obtain a current template of the current block;

a template obtaining unit configured to, for each motion vector in the searching scope, obtain a reference template to which the current template corresponds from the up-sampled first reference blocks;

a calculating unit configured to calculate respectively matching differences between the current template and each reference template; and a determining unit configured to select multiple motion vectors corresponding to multiple reference templates of minimum matching difference as the candidate motion vectors of the current block.

18. The device according to claim 12, wherein the device further comprises an encoding unit configured to calculate a residual value between the current block and the predicted value and to transmit the residual value to a decoder after encoding.

19. The device according to claim 12, wherein the device further comprises a decoding unit configured to decode the obtained residual value of the current block and to obtain a restored value of the current block by adding the residual value of the current block to the predicted value of the current block.

* * * * *